United States Patent
Kim et al.

(10) Patent No.: US 10,843,728 B2
(45) Date of Patent: Nov. 24, 2020

(54) METHOD AND DEVICE FOR DELIVERING STEERING INTENTION OF AUTONOMOUS DRIVING MODULE OR DRIVER TO STEERING APPARATUS OF SUBJECT VEHICLE MORE ACCURATELY

(71) Applicant: Stradvision, Inc., Pohang-si (KR)

(72) Inventors: Kye-Hyeon Kim, Seoul (KR);
Yongjoong Kim, Pohang-si (KR);
Hak-Kyoung Kim, Pohang-si (KR);
Woonhyun Nam, Pohang-si (KR);
SukHoon Boo, Anyang-si (KR);
Myungchul Sung, Pohang-si (KR);
Dongsoo Shin, Suwon-si (KR);
Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/740,213

(22) Filed: Jan. 10, 2020

(65) Prior Publication Data
US 2020/0247469 A1    Aug. 6, 2020

Related U.S. Application Data (60) Provisional application No. 62/799,407, filed on Jan. 31, 2019.

(51) Int. Cl.
*B62D 15/02*    (2006.01)
*G05D 1/00*    (2006.01)

(52) U.S. Cl.
CPC ......... *B62D 15/021* (2013.01); *B62D 15/029* (2013.01); *G05D 1/0088* (2013.01)

(58) Field of Classification Search
CPC ... B62D 15/021; B62D 15/029; G05D 1/0088
(Continued)

(56) References Cited

U.S. PATENT DOCUMENTS

| | | | | |
|---|---|---|---|---|
| 2008/0208412 A1* | 8/2008 | Shinmura | ............. | B62D 9/002 701/42 |
| 2013/0289826 A1* | 10/2013 | Yoshitake | ............ | B62D 15/021 701/42 |

(Continued)

FOREIGN PATENT DOCUMENTS

| | | | | |
|---|---|---|---|---|
| EP | 1870311 A1 | * | 12/2007 | ............. B62D 6/002 |
| JP | 2715555 B2 | * | 2/1998 | |
| JP | 6032043 B2 | * | 11/2016 | |

OTHER PUBLICATIONS

Jae et al., "Research on navigation system of an autonomous vehicle using RTK-DGPS," Year: 2004, vol. 2, Conference Paper.*

*Primary Examiner* — Tuan C To
(74) *Attorney, Agent, or Firm* — Kaplan Breyer Schwarz, LLP (57) ABSTRACT

A method for delivering a steering intention of an autonomous driving module to a steering apparatus more accurately by using a reference map is provided. And the method includes steps of: (a) a computing device, if a subject intended steering signal inputted by the autonomous driving module at a current timing is acquired, instructing a signal adjustment module to select, by referring to the reference map, specific reference steering guide values corresponding to the subject intended steering signal; (b) the computing device (i) adjusting the subject intended steering signal by referring to the specific reference steering guide values, in order to generate a subject adjusted steering signal, and (ii)

(Continued)

transmitting the subject adjusted steering signal to the steering apparatus, to thereby support the steering apparatus to rotate the subject vehicle by a specific steering angle corresponding to the subject intended steering signal.

16 Claims, 3 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 2015/0225014 | A1* | 8/2015 | Takeda | B62D 15/025 701/41 |
| 2015/0291210 | A1* | 10/2015 | Kageyama | B62D 5/04 701/41 |
| 2015/0375780 | A1* | 12/2015 | Chai | B62D 6/008 701/41 |
| 2016/0355212 | A1* | 12/2016 | Takaso | B62D 1/28 |
| 2017/0129482 | A1* | 5/2017 | Sunahara | B60W 30/045 |
| 2018/0079407 | A1* | 3/2018 | Izumi | B62D 15/022 |
| 2018/0297631 | A1* | 10/2018 | Miyatani | B62D 6/00 |
| 2018/0348771 | A1* | 12/2018 | Chu | G05D 1/0214 |
| 2019/0092332 | A1* | 3/2019 | Stark | B60W 50/038 |
| 2019/0138004 | A1* | 5/2019 | Palanisamy | G05D 1/0088 |
| 2019/0163176 | A1* | 5/2019 | Wang | G05D 1/0027 |
| 2019/0163178 | A1* | 5/2019 | Sidle | G01S 13/862 |
| 2019/0186925 | A1* | 6/2019 | Lee | G01C 21/28 |
| 2019/0187705 | A1* | 6/2019 | Ganguli | B60W 60/00 |
| 2019/0317520 | A1* | 10/2019 | Zhang | B60W 50/0098 |
| 2019/0332111 | A1* | 10/2019 | Michalakis | G06K 9/00791 |
| 2020/0047770 | A1* | 2/2020 | Ozawa | B60N 2/002 |
| 2020/0047773 | A1* | 2/2020 | Akaba | B60W 10/04 |
| 2020/0064856 | A1* | 2/2020 | Silver | H04R 5/027 |
| 2020/0079385 | A1* | 3/2020 | Beaurepaire | G05D 1/0212 |
| 2020/0080855 | A1* | 3/2020 | Pandit | G05D 1/0231 |
| 2020/0180689 | A1* | 6/2020 | Asaka | B62D 6/10 |

* cited by examiner

METHOD AND DEVICE FOR DELIVERING STEERING INTENTION OF AUTONOMOUS DRIVING MODULE OR DRIVER TO STEERING APPARATUS OF SUBJECT VEHICLE MORE ACCURATELY

CROSS REFERENCE OF RELATED APPLICATION

This application claims the benefit of priority to U.S. Provisional Patent Application No. 62/799,407, filed Jan. 31, 2019, the entire contents of which are incorporated herein by reference.

FIELD OF THE DISCLOSURE

The present disclosure relates to a method and a device to be used for an autonomous vehicle; and more particularly to the method for delivering a steering intention of an autonomous driving module or a driver to a steering apparatus of a subject vehicle more accurately, and the device using the same.

BACKGROUND OF THE DISCLOSURE

Recently, autonomous driving technologies have attracted attention. The autonomous driving technologies refer to technologies that allow an autonomous vehicle to travel safely by collecting and using external information through modules capable of acquiring the external information, such as a sensor and a camera mounted on the vehicle. The autonomous driving technologies have been developed so much that the autonomous vehicle is able to drive hundreds of kilometers without an accident.

However, there may be a serious flaw in such autonomous driving technologies. That is, if physical characteristics corresponding to parameters used by a network for the autonomous driving are changed and thus if said parameters do not fit the physical characteristics, the autonomous vehicle may not function correctly, even in case the network for the autonomous driving have calculated a correct value. In one example, even in case the network for the autonomous driving inputs the correct value to a steering module, the autonomous vehicle may not be turned correctly if an angle of the steering module is distorted.

However, only how to calculate the correct value has been studied, and ways to solve the problem as shown above has not been studied much.

SUMMARY OF THE DISCLOSURE

It is an object of the present disclosure to solve all the aforementioned problems.

It is another object of the present disclosure to provide a method for delivering a steering intention of an autonomous driving module or a driver to a steering apparatus of a subject vehicle more accurately, to thereby improve a credibility of an autonomous driving.

It is still another object of the present disclosure to provide a method for generating a reference map to be used for delivering the steering intention of the autonomous driving module or the driver to the steering apparatus of the subject vehicle more accurately.

It is still yet another object of the present disclosure to alert the driver to a possible breakdown of the steering apparatus while delivering the steering intention of the autonomous driving module or the driver to the steering apparatus of the subject vehicle more accurately.

In accordance with one aspect of the present disclosure, there is provided a method for delivering a steering intention of an autonomous driving module or a driver to a steering apparatus of a subject vehicle more accurately by using a reference map which is a rule-set generated by referring to past driving records of the subject vehicle, including steps of: (a) a computing device, if a subject intended steering signal included in a subject control signal inputted by the autonomous driving module or the driver at a current timing is acquired, instructing a signal adjustment module to select, by referring to the reference map generated by using past adjusted steering signals and past actual steered angles included in the past driving records, one or more specific reference steering guide values, among reference steering guide values of the reference map, corresponding to the subject intended steering signal; and (b) the computing device (i) adjusting the subject intended steering signal by referring to the specific reference steering guide values, in order to generate a subject adjusted steering signal, and (ii) transmitting the subject adjusted steering signal to the steering apparatus, to thereby support the steering apparatus to rotate the subject vehicle by a specific steering angle corresponding to the subject intended steering signal, which has been intended by the autonomous driving module or the driver.

As one example, the method, before the step of (a), further includes a step of: (a0) the computing device (i) generating a first vector including information on the past adjusted steering signals, a second vector including information on the past actual steered angles, and a third vector including information on prescribed reference actual steering angles, (ii) performing a regression operation by using the first, the second, and the third vectors, and (iii) generating the reference map including information on (iii-1) the reference steering guide values generated by the regression operation, (iii-2) the reference actual steering angles and (iii-3) a relationship between the reference steering guide values and the reference actual steering angles.

As one example, at the step of (a0), the computing device performs the regression operation by using a following formula to generate the reference steering guide values:

$$\Theta_{refsignal} = K(\Theta_{refangle}, \Theta_{pastangle})[K(\Theta_{pastangle}, \Theta_{pastangle}) + \sigma_n^2 I]^{-1}(\Theta_{pastsignal} - \Theta_{pastangle}) + \Theta_{refangle}$$

wherein $\Theta_{pastsignal}$ denotes the first vector, $\Theta_{pastangle}$ denotes the second vector, $\Theta_{refangle}$ angle denotes the third vector, $\Theta_{refsignal}$ denotes a fourth vector including information on the reference steering guide values, $K(\Theta_1, \Theta_2)$ denotes an output of a kernel function for two input vectors $\Theta_1$ and $\Theta_2$, and $\sigma_n$ denotes estimated standard deviations of noises of the past actual steered angles.

As one example, the past adjusted steering signals have been acquired by using past control signals transmitted by the autonomous driving module or the driver for a prescribed time range from a certain past timing to the current timing, and wherein the past actual steered angles are acquired by analyzing a motion of the subject vehicle performed during said time range through at least one of a computer vision module and a steering detection sensor which interwork with the computing device.

As one example, the method further includes a step of: (a1) the computing device generating each of steering accuracy scores by referring to each of the reference actual steering angles and its corresponding reference steering guide values, and determining whether to transmit an alarm on the steering apparatus to the driver or not by referring to the steering accuracy scores.

As one example, at the step of (a1), the computing device compares sizes of each of the reference actual steering angles and its corresponding reference steering guide values, to thereby generate each of the steering accuracy scores corresponding to each of similarities between each of the reference actual steering angles and its corresponding reference steering guide values, and transmits the alarm if a ratio of the number of specific steering accuracy scores to the total number of the steering accuracy scores is larger than a first threshold, wherein the specific steering accuracy scores, selected among the steering accuracy scores, are smaller than a second threshold.

As one example, performs processes corresponding to the steps of (a0) and (a1) if a trigger corresponding to a start of the subject vehicle is detected.

As one example, at the step of (a), the computing device instructs the signal adjustment module to (i) calculate similarity scores between the reference actual steering angles and the subject intended steering signal by referring to the subject intended steering signal representing the specific steering angle, (ii) find a first to an N-th specific reference actual steering angles corresponding to specific similarity scores which are the top N ones among the similarity scores, and (iii) find a first to an N-th specific reference steering guide values corresponding to the first to the N-th specific reference actual steering angles by referring to information on relationships between the reference actual steering angles and its corresponding reference steering guide values, and wherein, at the step of (b), the computing device performs a linear interpolation by referring to the first to the N-th specific reference actual steering angles and their corresponding first to the N-th specific reference steering guide values, to thereby generate the subject adjusted steering signal.

In accordance with still another aspect of the present disclosure, there is provided a computing device for delivering a steering intention of an autonomous driving module or a driver to a steering apparatus of a subject vehicle more accurately by using a reference map which is a rule-set generated by referring to past driving records of the subject vehicle, including: at least one memory that stores instructions; and at least one processor configured to execute the instructions to perform processes of: (I) if a subject intended steering signal included in a subject control signal inputted by the autonomous driving module or the driver at a current timing is acquired, instructing a signal adjustment module to select, by referring to the reference map generated by using past adjusted steering signals and past actual steered angles included in the past driving records, one or more specific reference steering guide values, among reference steering guide values of the reference map, corresponding to the subject intended steering signal; and (II) (i) adjusting the subject intended steering signal by referring to the specific reference steering guide values, in order to generate a subject adjusted steering signal, and (ii) transmitting the subject adjusted steering signal to the steering apparatus, to thereby support the steering apparatus to rotate the subject vehicle by a specific steering angle corresponding to the subject intended steering signal, which has been intended by the autonomous driving module or the driver.

As one example, before the process of (I), the processor further performs a process of: (I0) (i) generating a first vector including information on the past adjusted steering signals, a second vector including information on the past actual steered angles, and a third vector including information on prescribed reference actual steering angles, (ii) performing a regression operation by using the first, the second, and the third vectors, and (iii) generating the reference map including information on (iii-1) the reference steering guide values generated by the regression operation, (iii-2) the reference actual steering angles and (iii-3) a relationship between the reference steering guide values and the reference actual steering angles.

As one example, at the process of (IC)), the processor performs the regression operation by using a following formula to generate the reference steering guide values:

$$\Theta_{refsignal} = K(\Theta_{refangle}, \Theta_{pastangle})[K(\Theta_{pastangle}, \Theta_{pastangle}) + \sigma_n^2 I]^{-1}(\Theta_{pastsignal} - \Theta_{pastangle}) + \Theta_{refangle}$$

wherein $\Theta_{pastsignal}$ denotes the first vector, $\Theta_{pastangle}$ denotes the second vector, $\Theta_{refangle}$ angle denotes the third vector, $\Theta_{refsignal}$ denotes a fourth vector including information on the reference steering guide values, $K(\Theta_1, \Theta_2)$ denotes an output of a kernel function for two input vectors $\Theta_1$ and $\Theta_2$, and $\sigma_n$ denotes estimated standard deviations of noises of the past actual steered angles.

As one example, the past adjusted steering signals have been acquired by using past control signals transmitted by the autonomous driving module or the driver for a prescribed time range from a certain past timing to the current timing, and wherein the past actual steered angles are acquired by analyzing a motion of the subject vehicle performed during said time range through at least one of a computer vision module and a steering detection sensor which interwork with the computing device.

As one example, the processor further performs a process of: (I1) generating each of steering accuracy scores by referring to each of the reference actual steering angles and its corresponding reference steering guide values, and determining whether to transmit an alarm on the steering apparatus to the driver or not by referring to the steering accuracy scores.

As one example, at the process of (I1), the processor compares sizes of each of the reference actual steering angles and its corresponding reference steering guide values, to thereby generate each of the steering accuracy scores corresponding to each of similarities between each of the reference actual steering angles and its corresponding reference steering guide values, and transmits the alarm if a ratio of the number of specific steering accuracy scores to the total number of the steering accuracy scores is larger than a first threshold, wherein sizes of the specific steering accuracy scores, selected among the steering accuracy scores, are smaller than a second threshold.

As one example, the processor performs the processes of (I0) and (I1) if a trigger corresponding to a start of the subject vehicle is detected.

As one example, at the process of (I), the processor instructs the signal adjustment module to (i) calculate similarity scores between the reference actual steering angles and the subject intended steering signal by referring to the subject intended steering signal representing the specific steering angle, (ii) find a first to an N-th specific reference actual steering angles corresponding to specific similarity scores which are the top N ones among the similarity scores, and (iii) find a first to an N-th specific reference steering guide values corresponding to the first to the N-th specific reference actual steering angles by referring to information on relationships between the reference actual steering angles and its corresponding reference steering guide values, and wherein, at the process of (II), the processor performs a linear interpolation by referring to the first to the N-th specific reference actual steering angles and their corresponding first to the N-th specific reference steering guide values, to thereby generate the subject adjusted steering signal.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
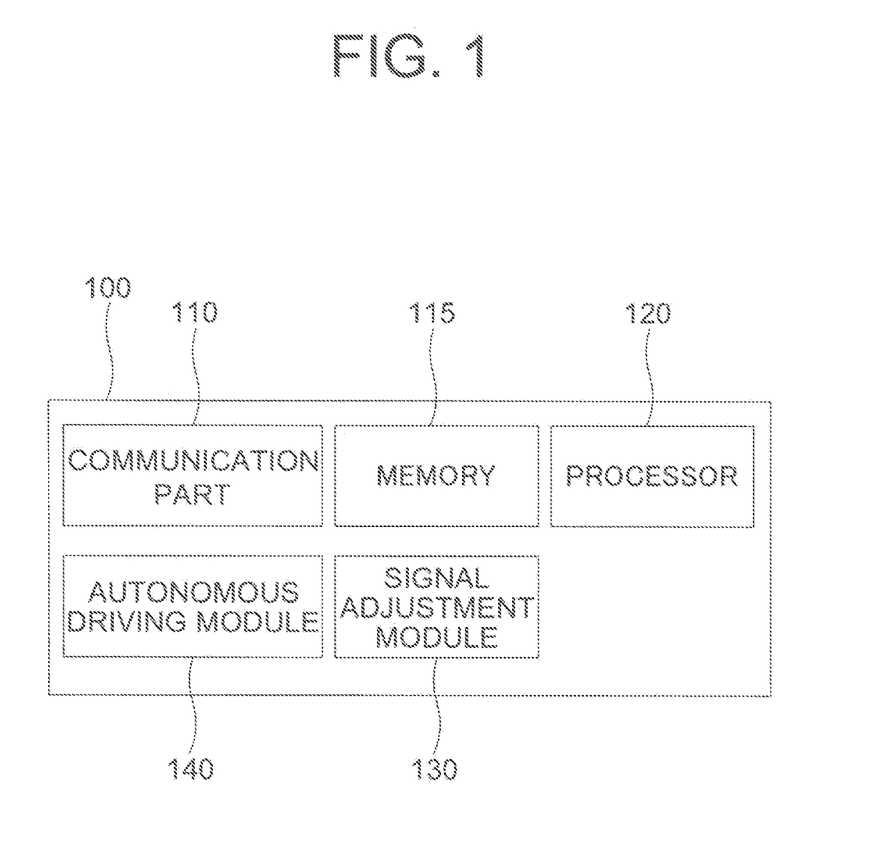
FIG. 1 is a drawing schematically illustrating a configuration of a computing device performing a method for delivering a steering intention of an autonomous driving module or a driver to a steering apparatus of a subject vehicle more accurately in accordance with one example embodiment of the present disclosure.

FIG. 1 is a drawing schematically illustrating a configuration of a computing device performing a method for delivering a steering intention of an autonomous driving module or a driver to a steering apparatus of a subject vehicle more accurately in accordance with one example embodiment of the present disclosure.

By referring to FIG. 1, the computing device 100 may include a signal adjustment module 130 and an autonomous driving module 140 to be described later. Processes of input/output and computations of the signal adjustment module 130 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

So far the configuration of the computing device 100 performing the method for delivering the steering intention of the autonomous driving module or the driver to the steering apparatus of the subject vehicle more accurately in accordance with one example embodiment of the present disclosure has been explained. Below, the method itself will be explained more specifically.

Figure 2:
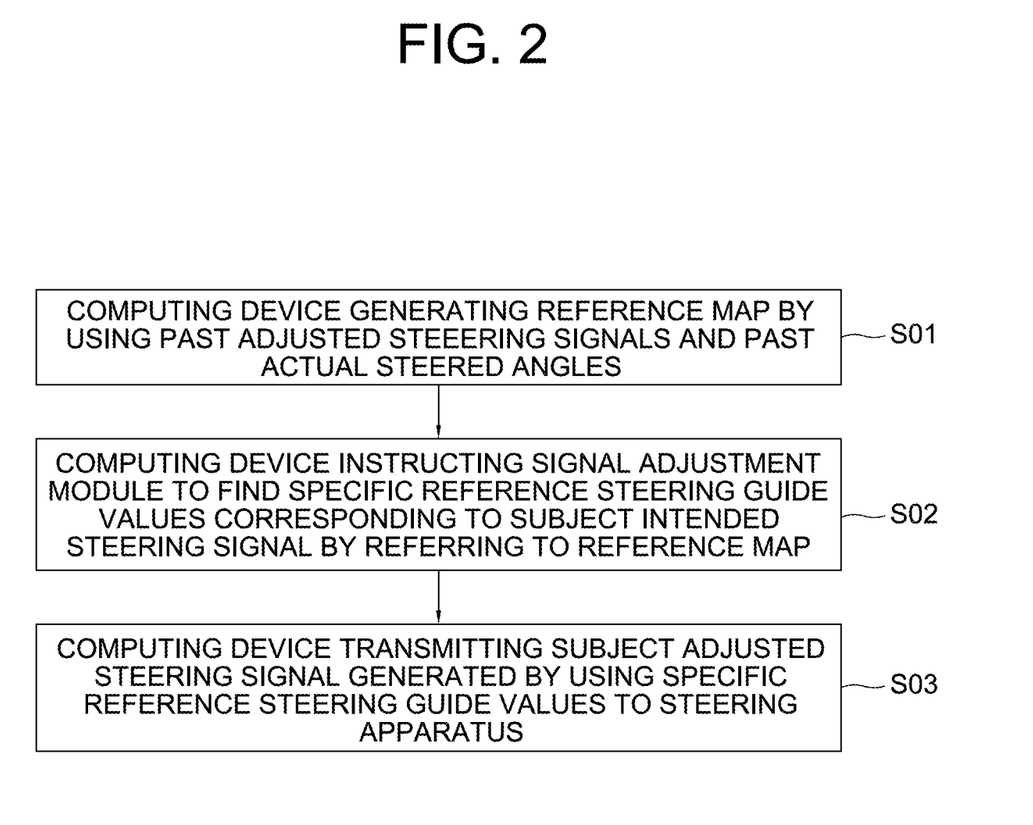
FIG. 2 is a drawing schematically illustrating a flow of the method for delivering the steering intention of the autonomous driving module or the driver to the steering apparatus of the subject vehicle more accurately in accordance with one example embodiment of the present disclosure.

FIG. 2 is a drawing schematically illustrating a flow of the method for delivering the steering intention of the autonomous driving module or the driver to the steering apparatus of the subject vehicle more accurately in accordance with one example embodiment of the present disclosure.

By referring to FIG. 2, at a step of S01, the computing device 100 may generate a reference map by using one or more past adjusted steering signals and one or more past actual steered angles. And, at a step of S02, the computing device 100, if a subject intended steering signal is acquired, may instruct the signal adjustment module 130 to find one or more specific reference steering guide values corresponding to the subject intended steering signal by referring to the reference map. Then, at a step of S03, the computing device 100 may transmit a subject adjusted steering signal to the steering apparatus, generated by using the specific reference steering guide values, to thereby support the steering apparatus to rotate the subject vehicle by a specific steering angle corresponding to the subject intended steering signal.

So far a brief flow of the method has been explained. Below, it will be explained more specifically.

First, the method of the present disclosure is directed to a method for ensuring the subject vehicle to be turned as the intention of the autonomous driving module or the driver, even though the steering apparatus of the subject vehicle malfunctions due to internal or external factors, by using the reference map. Herein, the reference map may be configured as a table. Such reference map may be generated by referring to the past adjusted steering signals inputted to the steering apparatus of the subject vehicle and the past actual steered angles which denote real angles of the subject vehicle being actually rotated when the past adjusted steering signals are inputted, included in the past driving records. As one example, a specific past adjusted steering signal may have been inputted to the steering apparatus to rotate the subject vehicle by 32 degrees but the subject vehicle has been rotated by 30 degrees so that its corresponding specific past actual steered angle may denote a rotation by 30 degrees. Such difference between the two angles may have been caused by a breakdown of the steering apparatus.

The past adjusted steering signals and the past actual steered angles may have been detected and stored during a prescribed time range from a certain past timing to the current timing. The past adjusted steering signals may have been detected by analyzing past control signals internally transmitted from the autonomous driving module or the driver, and the past actual steered angles may have been detected by analyzing a motion of the subject vehicle performed during said prescribed time range, through at least one of a computer vision module and a steering detection sensor, which interworks with the computing device 100. More specifically, the past actual steered angles may not be acquired by analyzing internal signals, different from the past adjusted steering signals. That is, those may be acquired by using external sensors such as the computer vision module and the steering detection sensor. The computer vision module may interwork with a camera on the subject vehicle and calculate an angle of a rotation of the subject vehicle by analyzing an image acquired through the camera, using a well-known angle calculation schemes. Otherwise, the steering detection sensor may be installed on the steering apparatus as a physical external sensor, to detect an angle of a rotation of wheels.

The past adjusted steering signals and the past actual steered angles may be additionally processed in order to be used for generating the reference map. Such additional process may represent a process of finding information on general relationships between reference steering guide values and reference actual steering angles by using the past adjusted steering signals and the past actual steered angles. Herein, the reference steering guide values may represent signals to be inputted to the steering apparatus, and the reference actual steering angles may represent actual steered angles expected when said signals are inputted thereto.

Herein, the reference steering guide values may denote values to be inputted to the steering apparatus to make the subject vehicle to rotate by their corresponding reference actual steering angles. As one example, if the subject vehicle is to be rotated by 30 degrees when a signal representing a rotation of 32 degrees is inputted to the steering apparatus, a specific reference actual steering angle of 32 degrees may correspond to a specific reference steering guide value of 30 degrees.

Herein, someone may question why relationships between the past adjusted steering signals and the past actual steered angles are not used directly, even though the relationships between those two are already acquired without the additional process. Those cannot used directly because the past adjusted steering signals and the past actual steered angles cannot cover all general possible cases. For example, if the subject intended steering signal corresponds to an angle which is not included in the past actual steered angles, the subject intended steering signal may not be adjusted properly. Thus, in order to cover the all possible cases, the past adjusted steering signals and the past actual steered angles should be additionally processed in order to generate the reference map. To be simple, the additional process may be performed to find the general relationships by using specific relationships acquired during the prescribed time range.

Meanwhile, the reference actual steering angles may have been set by a manager to cover all angles expected to be intended by the autonomous driving module or the driver. As one example, it may have been set as [−60.00, −59.90, −59.80, . . . , 59.80, 59.90, 60.00], covering a range between −60 degrees and 60 degrees at 0.1 degree intervals. Such range and the intervals may be determined by the manager from the beginning. Otherwise, the reference actual steering angles may be set continuously, not discretely as shown above, but a scope of the present disclosure may not be limited thereto.

Under an assumption stated above, the computing device 100 may perform a regression operation, e.g., a Gaussian Process Regression(GP Regression), to generate the reference steering guide values by using a following formula:

$$\Theta_{refsignal} = K(\Theta_{refangle}, \Theta_{pastangle})[K(\Theta_{pastangle}, \Theta_{pastangle}) + \sigma_n^2 I]^{-1}(\Theta_{pastsignal} - \Theta_{pastangle}) + \Theta_{refangle}$$

Herein, $\Theta_{pastsignal}$ may denote a first vector including information on the past adjusted steering signals and $\Theta_{pastangle}$ may denote a second vector including information on the past actual steered angles. Also, $\Theta_{refangle}$ may denote a third vector including information on said prescribed reference actual steering angles, and $\Theta_{refsignal}$ may denote a fourth vector including information on the reference steering guide values. Further, $K(\Theta_1, \Theta_2)$ may denote an output of a kernel function for two input vectors $\Theta_1$ and $\Theta_2$, and $\sigma_n$ may denote estimated standard deviations of noises of the past actual steered angles. As one example, the kernel function may be given as $$K(x, x') = \exp\left(-\frac{\lambda}{2}|x - x'|^2\right).$$

The reference steering guide values can be determined by using the formula owing to characteristics of the GP regression. The GP regression is a regression operation for estimating a function value of an input $x \varepsilon R^N$ by using a given data set including information on $x_i \varepsilon R^N$ and its corresponding function values $y_i \varepsilon R^M$ in a form of a probability distribution. Herein, $x_i \varepsilon \ R^N$ may correspond to the past actual steered angles, $y_i \varepsilon \ R^M$ may correspond to the past adjusted steering signals, $x \varepsilon \ R^N$ may correspond to the reference actual steered angles, and averages of the probability distribution to be used for estimating the function values of the reference actual steered angles may be the reference steering guide values. By performing the GP regression as shown above, the relationships between the reference steering guide values and the reference actual steered values may be found.

For reference, the formula for the GP regression can be deducted from a following formula:

$$\begin{bmatrix} \Theta_{pastsignal} \\ \Theta_{refsignal} \end{bmatrix} \sim$$

$$N\left( \begin{bmatrix} \Theta_{pastangle} \\ \Theta_{refangle} \end{bmatrix}, \begin{bmatrix} K(\Theta_{pastangle}, \Theta_{pastangle}) + \sigma_n^2 I & K(\Theta_{pastangle}, \Theta_{refangle}) \\ K(\Theta_{pastangle}, \Theta_{refangle}) & K(\Theta_{refangle}, \Theta_{refangle}) \end{bmatrix} \right)$$

A mathematical basis of the above processes is a thesis named "Gaussian Process for Machine Learning" of Rasmussen et al., 2016. By referring to the thesis, a person in the art may understand the present disclosure which is a practical application of contents of the thesis. Also, the person in the art may easily deduct a method for generating more various reference steering guide values by further using variances of the probability distributions, from the present disclosure using only averages thereof, thus such embodiment is included in the scope of the present disclosure.

After the reference map is generated, the computing device 100 may instruct the signal adjustment module 130 to select one or more specific reference steering guide values, among reference steering guide values of the reference map, corresponding to the subject intended steering signal, by referring to the subject intended steering signal corresponding to the specific steering angle.

More specifically, the computing device 100 may instruct the signal adjustment module 130 to (i) calculate similarity scores between the reference actual steering angles and the subject intended steering signal by referring to the subject intended steering signal representing the specific steering angle, (ii) find a first to an N-th specific reference actual steering angles corresponding to specific similarity scores which are the top N ones among the similarity scores. Herein, a specific similarity score may be calculated by (i) comparing a size of the specific steering angle and a size of a specific reference actual steering angle, and (ii) setting one with larger size at a denominator and the other one with smaller size at a numerator. The whole similarity scores may be calculated similarly to the specific similarity score. Otherwise, as a simple approach, when N is 2, one of the reference steering guide values which is the smallest among ones larger than the specific steering angle may be set as a first specific reference steering guide value, and the other one of the reference steering guide values which is the largest among ones smaller than the specific steering angle may be set as a second specific reference steering guide value.

Thereafter, the computing device 100 may perform a linear interpolation by referring to the first to the N-th specific reference actual steering angles and their corresponding first to the N-th specific reference steering guide values, to thereby generate the subject adjusted steering signal. To explain such process, FIG. 3 will be referred to.

Figure 3:
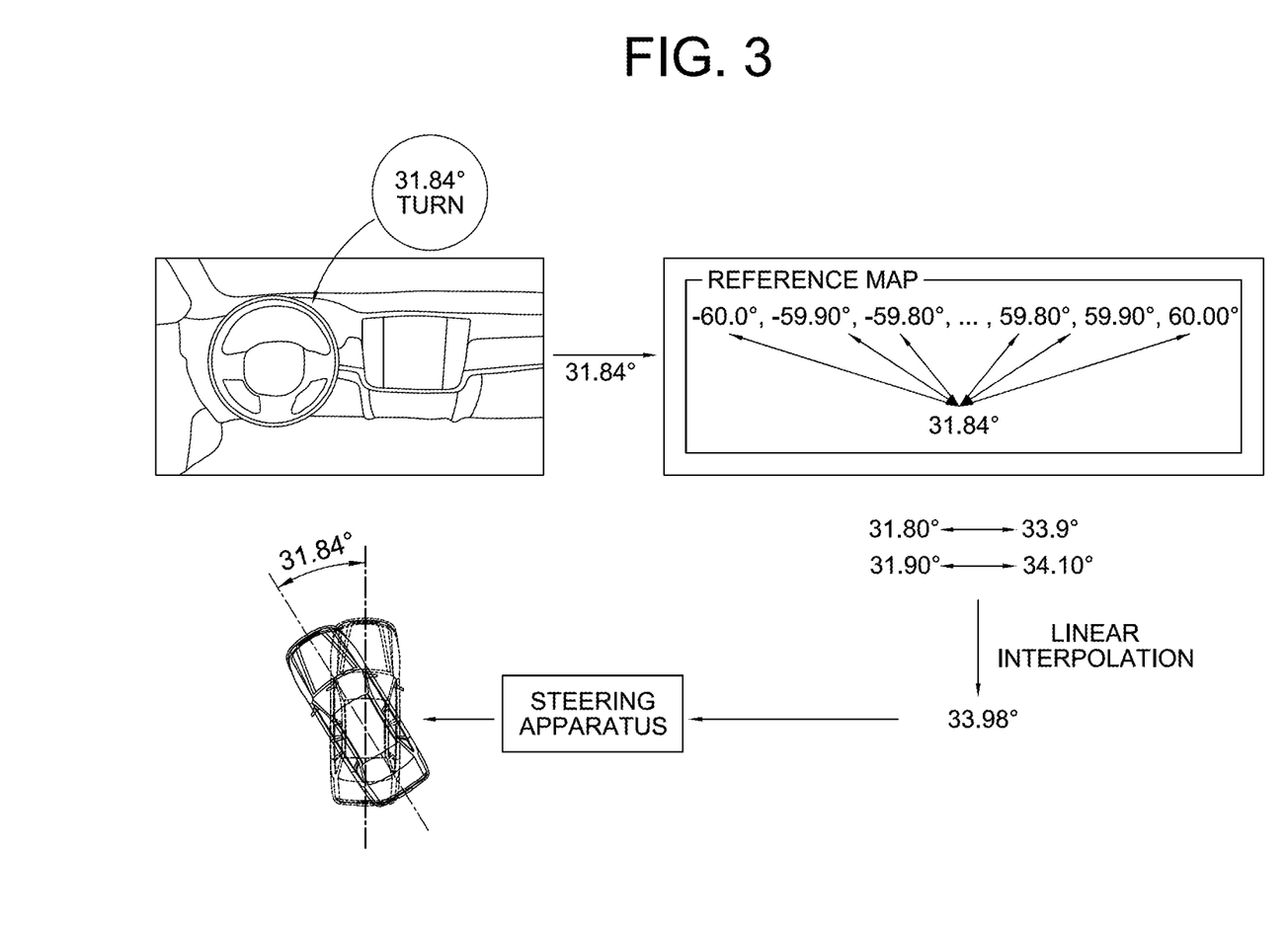
FIG. 3 is a drawing schematically illustrating how the subject vehicle is rotated by a specific steering angle corresponding to a subject adjusted steering signal, generated from a subject intended steering signal by delivering the steering intention of the autonomous driving module or the driver to the steering apparatus of the subject vehicle more accurately in accordance with one example embodiment of the present disclosure.

FIG. 3 is a drawing schematically illustrating how the subject vehicle is rotated by a specific steering angle corresponding to a subject adjusted steering signal, generated from a subject intended steering signal by delivering the steering intention of the autonomous driving module or the driver to the steering apparatus of the subject vehicle more accurately in accordance with one example embodiment of the present disclosure.

By referring to FIG. 3, it can be seen that the specific steering angle is 31.84 degrees, the reference actual steering angles are set as [−60.00, −59.90, −59.80, . . . , 59.80, 59.90, 60.00], N is two, the first specific reference steering guide value corresponding to the first specific reference actual steering angle of 31.80 degrees is 33.9 degrees, the second specific reference steering guide value corresponding to the second specific reference actual steering angle of 31.90 degrees is 34.10 degrees. In this case, the linear interpolation may be performed as shown below:

specific *refsignal* for $$31.84° = 33.9 + (34.1 - 33.9) \times \frac{31.84 - 31.80}{31.90 - 31.80} = 33.98°$$

Herein, the subject adjusted steering signal for this case may be 33.98 degrees, and the steering apparatus which acquired the subject adjusted steering signal as its input may rotate the subject vehicle by 31.84 degrees.

Below, some additional configurations of the present disclosure will be explained.

First, the processes corresponding to the steps of S01 and S02 may be performed whenever a trigger corresponding to a start of the subject vehicle is detected. To be simple, the steps of S01 and S02 may be performed whenever the subject vehicle is started.

Also, the computing device 100 may evaluate the steering apparatus while it generates the reference map. Specifically, the computing device 100 may generate each of steering accuracy scores by referring to each of the reference actual steering angles and its corresponding reference steering guide values. Herein, each of differences between each of the reference actual steering angles and its corresponding reference steering guide values can be an indicator for a dislocation of the steering apparatus, because the two may be largely different when the steering apparatus has a breakdown. Accordingly, the computing device 100 may compare each of the reference actual steering angles and its corresponding reference steering guide values, to thereby generate each of the steering accuracy scores corresponding to each of similarities between each of the reference actual steering angles and its corresponding reference steering guide values.

Thereafter, the computing device 100 may transmit an alarm to the driver if a ratio of the number of specific steering accuracy scores to the total number of the steering accuracy scores is larger than a first threshold. Herein, the specific steering accuracy scores, selected among the steering accuracy scores, may be smaller than a second threshold. For example, if a ratio of the number of the specific steering accuracy scores which is smaller than 0.95 to the total number is more than 0.1, the alarm may be transmitted.

The present disclosure has an effect of providing a method for delivering a steering intention of an autonomous driving module or a driver to a steering apparatus of a subject vehicle more accurately, to thereby improve a credibility of an autonomous driving.

The present disclosure has another of providing a method for generating a reference map to be used for delivering the steering intention of the autonomous driving module or the driver to the steering apparatus of the subject vehicle more accurately.

The present disclosure has still another effect of alerting the driver to a possible breakdown of the steering apparatus while delivering the steering intention of the autonomous driving module or the driver to the steering apparatus of the subject vehicle more accurately.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for steering a vehicle using a past driving record of the vehicle and a control signal from an autonomous driving module or a human driver, the method comprising:

receiving, by a computing device, the control signal from the autonomous driving module or the human driver, the control signal comprising an intended steering signal;

identifying, by the computing device, a reference map that is generated based on past adjusted steering signals and past actual steered angles in the past driving record of the vehicle;

selecting, by a signal adjustment module, based on the reference map and the intended steering signal, one or more of a plurality of reference steering guide values of the reference map;

adjusting, by the computing device, the intended steering signal based on the selected one or more reference steering guide values; and transmitting the adjusted steering signal to a steering apparatus of the vehicle, the adjusted steering signal causing the steering apparatus to rotate the vehicle by a first steering angle that corresponds to the intended steering signal received from the autonomous driving module or the human driver.

2. The method of claim 1, further comprising:

generating, by the computing device, a first vector comprising information on the past adjusted steering signals, a second vector comprising information on the past actual steered angles, and a third vector comprising information on reference actual steering angles;

performing a regression operation by using the first, the second, and the third vectors; and generating, by the computing device, the reference map, wherein the reference map comprises information on the reference steering guide values generated by the regression operation, the reference actual steering angles, and a relationship between the reference steering guide values and the reference actual steering angles.

3. The method of claim 2, wherein the regression operation is used to generate the reference steering guide values, and wherein the regression operation uses the formula:

$$\Theta_{refsignal}=K(\Theta_{refangle},\Theta_{pastangle})[K(\Theta_{pastangle},\Theta_{pastangle})+\sigma_n^2 I]^{-1}(\Theta_{pastsignal}-\Theta_{pastangle})+\Theta_{refangle}$$

wherein $\Theta_{pastsignal}$ denotes the first vector, $\Theta_{pastangle}$ denotes the second vector, $\Theta_{refangle}$ denotes the third vector, $\Theta_{refsignal}$ denotes a fourth vector including information on the reference steering guide values, $K(\Theta_1, \Theta_2)$ denotes an output of a kernel function for two input vectors $\Theta_1$ and $\Theta_2$, and $\sigma_n$ denotes estimated standard deviations of noises of the past actual steered angles.

4. The method of claim 2, wherein the past adjusted steering signals are based on past control signals received from the autonomous driving module or the human driver, and wherein the past actual steered angles are based on a motion of the vehicle.

5. The method of claim 2, further comprising:

generating, by the computing device, a plurality of steering accuracy scores based on the reference actual steering angles and the reference steering guide values; and determining, based on the plurality of steering accuracy scores, whether or not to issue an alarm on the steering apparatus.

6. The method of claim 5, further comprising selecting, by the computing device, one or more steering accuracy scores from the plurality of steering accuracy scores;

wherein the plurality of steering accuracy scores are generated based on a comparison between corresponding reference actual steering angles and reference steering guide values; and wherein the alarm is issued when a ratio of the number of selected steering accuracy scores to the total number of the plurality of steering accuracy scores is larger than a first threshold; and wherein each of the selected one or more steering accuracy scores are smaller than a second threshold.

7. The method of claim 5, wherein the generating of the first vector, the second vector, the third vector, and the steering accuracy scores are in response to detecting a start of the vehicle.

8. The method of claim 1, further comprising:

calculating, by the signal adjustment module, similarity scores between the reference actual steering angles and the first steering angle based on the intended steering signal corresponding to the first steering angle;

determining, by the signal adjustment module, the top N similarity scores, wherein N is a positive integer;

determining, by the signal adjustment module, N reference actual steering angles corresponding to the top N similarity scores; and determining, by the signal adjustment module, N reference steering guide values corresponding to the N reference actual steering angles;

wherein the adjusted steering signal is generated via interpolation.

9. A computing device for delivering a steering intention of an autonomous driving module or a human driver to a steering apparatus of a vehicle, the computing device comprising:

a memory to store instructions and a reference map that is generated by using past adjusted steering signals and past actual steered angles in a past driving record of the vehicle; and a processor to:

instruct a signal adjustment module to select, based on the reference map, one or more reference steering guide values from a plurality of reference steering guide values of the reference map when an intended steering signal included in a control signal inputted by the autonomous driving module or the human driver is acquired at a current timing, wherein the selected reference steering guide values correspond to the intended steering signal;

adjust the intended steering signal based on the selected one or more reference steering guide values; and transmit the adjusted steering signal to a steering apparatus of the vehicle, the adjusted steering signal causing the steering apparatus to rotate the vehicle by a first steering angle that corresponds to the intended steering signal received from the autonomous driving module or the human driver.

10. The computing device of claim 9, wherein the processor is further to:

generate a first vector comprising information on the past adjusted steering signals, a second vector comprising information on the past actual steered angles, and a third vector comprising information on reference actual steering angles;

perform a regression operation by using the first, the second, and the third vectors; and generate the reference map, wherein the reference map comprises information on the reference steering guide values generated by the regression operation, the reference actual steering angles, and a relationship between the reference steering guide values and the reference actual steering angles.

11. The computing device of claim 10, wherein, the regression operation is used to generate the reference steering guide values, and wherein the regression operation uses the formula:

$$\Theta_{refsignal}=K(\Theta_{refangle},\Theta_{pastangle})[K(\Theta_{pastangle},\Theta_{pastangle})+\sigma_n^2 I]^{-1}(\Theta_{pastsignal}-\Theta_{pastangle})+\Theta_{refangle}$$

wherein $\Theta_{pastsignal}$ denotes the first vector, $\Theta_{pastangle}$ denotes the second vector, $\Theta_{refangle}$ denotes the third vector, $\Theta_{refsignal}$ denotes a fourth vector including information on the reference steering guide values, $K(\Theta_1, \Theta_2)$ denotes an output of a kernel function for two input vectors $\Theta_1$ and $\Theta_2$, and $\sigma_n$ denotes estimated standard deviations of noises of the past actual steered angles.

12. The computing device of claim 10, wherein the past adjusted steering signals are based on past control signals received from the autonomous driving module or the human driver, and wherein the past actual steered angles are based on a motion of the vehicle.

13. The computing device of claim 10, wherein the processor is further to:

generate a plurality of steering accuracy scores by based on the reference actual steering angles and the reference steering guide values; and determine, based on the plurality of steering accuracy scores, whether or not to issue an alarm on the steering apparatus.

14. The computing device of claim 13, wherein the processor is further to select one or more steering accuracy scores from the plurality of steering accuracy scores; and wherein the plurality of steering accuracy scores are generated based on a comparison between corresponding reference actual steering angles and reference steering guide values; and wherein the alarm is issued when a ratio of the number of selected steering accuracy scores to the total number of the plurality of steering accuracy scores is larger than a first threshold; and wherein each of the selected one or more steering accuracy scores, are smaller than a second threshold.

15. The computing device of claim 13, wherein the generating of the first vector, the second vector, the third vector, and the steering accuracy scores are in response to detecting a start of the vehicle.

16. The computing device of claim 9, wherein the processor is further to instruct the signal adjustment module to:

calculate similarity scores between the reference actual steering angles and the first steering angle based on the intended steering signal corresponding to the specific first steering angle;

determine the top N similarity scores, wherein N is a positive integer;

determine N reference actual steering angles corresponding to the top N similarity scores; and determine N reference steering guide values corresponding to the N reference actual steering angles; and wherein the adjusted steering signal is generated via interpolation.

* * * * *